United States Patent [19]

Freiberg et al.

[11] 4,197,742
[45] Apr. 15, 1980

[54] TEMPERATURE MONITORING ARRANGEMENT FOR A MOVING COMPONENT

[75] Inventors: Bernd-Rainer Freiberg, Lampertheim; Wilfried Gehl, Weinheim; Jürgen Liebe, Kirchberg; Horst Muschelknautz, Crailsheim, all of Fed. Rep. of Germany

[73] Assignee: Voith Turbo GmbH & Co., KG, Crailsheim, Fed. Rep. of Germany

[21] Appl. No.: 921,246

[22] Filed: Jul. 5, 1978

[30] Foreign Application Priority Data

Jul. 4, 1977 [DE] Fed. Rep. of Germany ....... 2730141

[51] Int. Cl.² .............................................. G01K 7/00
[52] U.S. Cl. ................................................. 73/362 CP
[58] Field of Search ....... 73/362 CP, 362 NR, 362 R; 340/227 R

[56] References Cited

U.S. PATENT DOCUMENTS

| 2,020,067 | 11/1935 | Keinath | 73/362 CP |
|---|---|---|---|
| 3,303,701 | 2/1967 | Matsuura et al. | 73/362 CP |
| 3,891,861 | 6/1975 | Weber et al. | 73/362 CP |

*Primary Examiner*—Donald O. Woodiel
*Attorney, Agent, or Firm*—Ostrolenk, Faber, Gerb & Soffen

[57] ABSTRACT

Arrangement for monitoring the temperature of a moving component: a stationary measuring device including an oscillator; a sensor on the moving component is moved past the measuring device; the sensor includes a coil that is outside the moving component and a cold conductor that senses temperature and changes its impedance in response to temperature changes and that is inside the component and electrically connected to the coil, whereby the coil is effectively short circuited or effectively open on the different sides of a preset temperature level sensed by the cold conductor, and the effective condition of the coil is sensed by the measuring device; a capacitor may be placed in series with the coil; the coil is helical and is in a plane; the coil and the cold conductor and the connecting leads are held in place by an insulating substance; specifics of the sensor body configuration are disclosed.

22 Claims, 4 Drawing Figures

TEMPERATURE MONITORING ARRANGEMENT FOR A MOVING COMPONENT

BACKGROUND OF THE INVENTION

This invention relates to an arrangement for monitoring the temperature of a moving component, for example, for monitoring the oil temperature of a rotating hydraulic coupling. In this type of monitoring arrangement, when a preset temperature limit is attained, a temperature sensor arranged on the moving component operates a signal or some other responsive means associated with the moving component.

It is advisable to monitor the temperature of moving machine parts which under certain circumstances can be subjected to relatively high thermal loading during operation. In order to prevent damage to or failure of such machine parts, when a permitted temperature limit is exceeded, it is often necessary to switch off the machine drive or to take other appropriate steps.

Temperature problems of the above described kind arise, for instance, in hydraulic couplings, where an extremely rapid rise in temperature can be caused, especially during overloading and when a jam occurs. For this reason, it is advisable to monitor the oil temperature in the coupling so that suitable safety precautions can be initiated when there is an unacceptable rise in the oil temperature. For this purpose, temperature sensors are already known. They are typically installed in a housing wall of a hydraulic coupling and are held in place by a sweated or soldered joint which melts at a predetermined temperature. As soon as the sweated or soldered joint melts due to the temperature limit in the coupling being exceeded, a spring installed in the temperature sensor actuates a piston which can travel out sufficiently far to actuate a corresponding switching device which is adapted to initiate appropriate subsequent measures for the particular installation. In many cases, the appliance being monitored is simply switched off which permits location and removal of the cause of overheating.

Known temperature sensors of the above noted type have the inherent disadvantage that they are very expensive to manufacture and are reliable only to a relatively limited extent. Their relatively complicated construction inevitably means that despite the exercise of the greatest care and precision during manufacture, over a long operating period, reliable temperature sensor response cannot be guaranteed.

The above described temperature sensors have the further disadvantage that after each time one of them responds, a new temperature sensor has to be installed, since the temperature sensor is destroyed by each response. When a new temperature sensor is installed, not only is valuable working time taken up, but it may also be necessary to carry out rebalancing, especially in relatively fast-running machines.

The above-mentioned technical disadvantages enable only relatively expensive plants to be monitored with this type of temperature sensor, since it is too expensive to equip smaller and less expensive plant with the sensors. For many applications, moreover, the monitoring of temperature using a sensor which is destroyed when it responds is basically unacceptable.

SUMMARY OF THE INVENTION

The primary object of the invention is to provide an arrangement for monitoring the temperature of a moving component, which is of simple and robust construction, which responds reliably even after long periods of operation, and which also functions without being destroyed.

According to the invention, the temperature sensor of the arrangement has an electrical device connected to the ends of a coil for sensing the temperature. The coil is effectively short-circuited on one side of a temperature limit being monitored and is effectively open on the other side of this temperature limit. There is a measuring device that includes an initiator having an oscillator for operation without contact with the temperature sensor, and the measuring device is arranged to produce impulses due to damping occurring in the oscillator only when the passing coil is in a selected one of its effective conditions, i.e. short-circuited or open circuit. The absence of impulses is indicative of the passing coil having changed from one normal effective condition to its other condition thereby causing the signal to be released or initiated.

The invention thus provides a monitoring arrangement comprising the combination of a temperature sensor and an initiator incorporating an oscillator. In practice, these two co-acting parts are so tuned to each other that when the coil passes by the oscillator of the initiator within a preset distance range, an alarm signal or a switching process, or the like, is released or initiated when the temperature being monitored has risen above a preset temperature.

In one preferred mode of the invention, if the coil in the temperature sensor is short-circuited below the temperature limit, when the coil passes in front of the oscillator, damping of the oscillator is obtained. Conversely, when the coil is open above the temperature limit, there is no damping of the oscillator. In order to short-circuit or open the coil in the temperature sensor in the desired manner, various suitable devices can be used, such as a thermal switch, or the like.

According to a preferred constructional form of the invention, provision is made for the resistance-temperature characteristic of a cold conductor to be used in an advantageous manner. Depending on the type of cold conductor used, this characteristic displays an extremely steep rise in resistance in a very narrow temperature range which can be selected within relatively wide limits. In many cold conductors, this sudden rise in resistance amounts to a magnitude of some kilo-ohms within a temperature range of up to around 20° C., and can be located in the temperature range which corresponds to the temperature limit to be monitored.

It is also within the scope of the invention to use a component such as a hot conductor in the temperature sensor, so that, in the opposite manner from the constructional form described above, the oscillator in the initiator is only damped when a preset temperature limit is exceeded.

Because it functions as described above, an arrangement according to the invention has the important advantage that it operates absolutely without damage, so that, for example, after a rise in the oil temperature of a hydraulic coupling above the preset value, and after the temperature sensor has responded, the arrangement becomes ready for use again, without any further action being required immediately after the oil temperature has fallen below the preset value again. Thus, not only are the stoppage times which were previously necessary for the installation of new temperature sensors eliminated, but balancing or rebalancing is also not required, as was formerly the case with fast running parts after the installation of a replacement part. Since impulses are emitted constantly while the coupling rotates, the rotary speed can also be monitored via these impulses, in addition to the temperature monitoring.

Furthermore, since an arrangement according to the invention is of extremely robust construction and operates virtually without any moving parts, extremely reliable operation can be expected even after extreme operating conditions and long operating times. An arrangement according to the invention also has the important advantage that its manner of operating virtually has a "closed-circuit" characteristic, as it is always possible to detect whether the temperature sensor is operating properly. Thus, if a lead between the coil and, for example, a cold conductor should be broken, or if there should be some other failure which results in the breakage of the lead connection, then the monitoring arrangement according to the invention would be compelled to respond. The closed-circuit characteristic also comes to bear even when there is a fault in the oscillator, or more generally in the initiator, since impulses would not be emitted if there were a failure in this part of the arrangement, and the monitoring arrangement according to the invention would respond.

The temperature sensor of the monitoring arrangement according to the invention can be produced and installed at suitable points in a machine part so cheaply that, in particular, hydraulic couplings can be equiped with them during mass production at relatively small cost, so that there will be no necessity of carrying out subsequent conversions. With known types of sensors, due to the cost involved, a monitoring arrangement is frequently not initially provided but is in many instances later found to be necessary.

According to another preferred constructional form of the invention, provision can be made for a capacitor or condenser to be arranged in series with the coil in order to form a series resonant circuit. If the resonance frequency of the oscillator in the measuring device and the resonance frequency of this series resonant circuit are tuned to each other, the sensitivity of the measuring device can be greatly increased. This means that with this preferred constructional form, the distance between the coil and the oscillator of the initiator can be greatly increased. This means that with this preferred constructional form, the distance between the coil and the oscillator of the initiator can be increased by around 30% compared with an arrangement without a condenser. This possibility is of particular advantage in measuring tasks where, for example, due to a relatively large amount of axial play in a hydraulic coupling, it is necessary to maintain correspondingly large tolerances between the coil and the initiator.

In order to achieve a particularly flat arrangement of the coil, the coil may be arranged as a printed coil on a circuit board that is made of synthetic material. Moreover, according to an advantageous constructional form, the coil, the connecting leads and the cold conductor are embedded in an insulating substance. In this way, these components are supported absolutely reliably and they are secured against vibration or other mechanical effects.

In order to keep the response time of the monitoring arrangement according to the invention as short as possible, it is advisable to arrange the cold conductor at a sufficient distance from the inner surface of the end face of the hydraulic coupling to which it is fitted when used to monitor the temperature in a hydraulic coupling, so that the hydraulic fluid can flow freely around the cold conductor. Covering the cold conductor with a material with good thermal conductivity properties provides good mechanical protection for the cold conductor and also promotes a rapid response time for the monitoring arrangement through sufficiently rapid transfer of heat.

Advantageously, the cold conductor and the coil can be arranged in a relatively small, compact body which is preferably screwed into the relevant end face of the housing of a hydraulic coupling. Key faces e.g. hexagonal faces, may be provided in an outer part of the body for facilitating screwing of the body into the housing.

The monitoring arrangement according to the invention affords the further advantage that the short impulses which occur at the initiator as the coil passes can be prolonged by a suitable impulse prolonging circuit to such an extent that they can be clearly distinguished from interference impulses by the subsequently connected evaluation circuit. In this way the outlay for laying screened leads, which would otherwise be necessary, is avoided.

Although until now cold conductors have generally been limited to use over a temperature range between approximately 50° to 200° C., this is not a disadvantage in practice because, particularly with hydraulic couplings and similar machine parts, the temperature to be monitored actually always falls within the temperature range which can be detected by a cold conductor. Thus, in a hydraulic coupling, for example, normally a possible critical temperature limit would lie in a range between around 100° to 140° C. This temperature range already lies well above the normal operating temperature of, for example, around 50° to 60° C. Depending on the application and the permitted temperature limit desired, it is therefore possible to select a cold conductor which has a resistance-temperature characteristic displaying a jump from a relatively low resistance level to a relatively high resistance level at the preset temperature limit which it is desired to monitor.

BRIEF DESCRIPTION OF THE DRAWINGS

In order that the invention may be readily understood, one example will now be described with reference to the accompanying drawings, in which.

DESCRIPTION OF A PREFERRED EMBODIMENT

Figure 1:
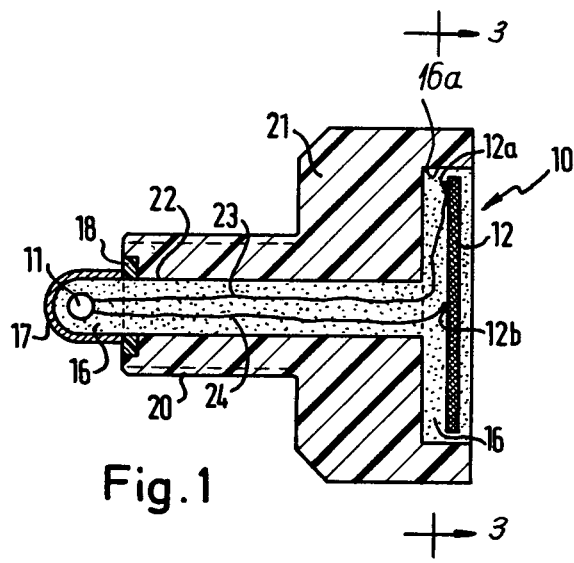
FIG. 1 is a schematic longitudinal section through a temperature sensor, according to the invention.

Referring to FIG. 1, the temperature sensor 10 includes a sensor body 21, which has a through bore 22 running the length of its central longitudinal axis. The body 21 is a substantially rotationally symmetrical component. The body has an extension, as shown on the left hand side of FIG. 1, of a relatively smaller diameter and which has an external screw thread 20. The temperature sensor 10 can thus be screwed, via the external thread, into the front face of a housing 15 of a hydraulic coupling, for example. The outwardly facing end of the body 21 has a larger diameter (as shown on the right-hand side of FIG. 1), and it includes a hexagonal key face so that the temperature sensor 10 may be held by the key face and screwed easily into the coupling with the aid of a wrench or spanner.

One end of the temperature sensor 10 can also be used to cooperate in forming a seal, by inserting a sealing ring between the end face of the sensor 10 and the front face of the hydraulic coupling.

The sensor body 21 is shown in FIG. 1 as being made of a synthetic material and is shown in one piece. The sensor body 21 can also be designed so that, for example, with a view to obtaining particularly high strength properties, a metal insert is used for the thread part and/or the key face.

A metallic, conductive coil 12 is accommodated within a recess 16a that is formed concentrically within the larger end face of the body 21. The coil is connected to a cold conductor 11, which is located at and just outside of the smaller diameter end of the body 21, via connecting leads 23 and 24 which extend through the bore 22 across the body 21. The cold conductor has the characteristic that it has a rapid change in its impedance as the temperature to which it is exposed exceeds a predetermined level. The coil, connecting leads and cold conductor are embedded in an insulating substance 16. This insulating substance can be a synthetic resin which is poured into the recess 16a in the body 21 after the components have been placed. In this way, not only the components, but also the connecting leads 23 and 24 and the connecting points for the ends 12a and 12b of the coil are mechanically secured against vibration or other effects.

Figure 3:
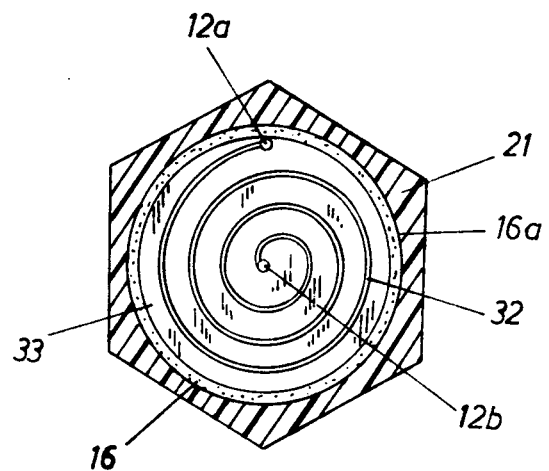
FIG. 3 is a cross-sectional view, along the line of arrows 3 in FIG. 1, of an alternate embodiment of a coil for the sensor.

In the embodiment of FIG. 1, the coil 12 is held in position by the insulating substance 16. Referring to FIG. 3, the coil 32, like the coil 12, is a helical coil in a flat plane, but the manner in which the coil 32 is supported differs from the manner in which the coil 12 is supported. Located in the recess 16a in the body 21 is a circuit board 33 that is comprised of an appropriate synthetic resin material. The circuit board 33, like the coil 12, is fixedly supported in position in the recess 16a by the insulating substance 16. On the inwardly facing surface of the circuit board 33, a helical coil of metallic material, e.g. foil or wire, is supported to define the coil 32 on the board 33. In all other respects, the coil arrangement shown in FIG. 3 and the sensor in which it is incorporated would be the same as the sensor shown in FIG. 1.

In order to provide good heat transfer between the cold conductor 11 and the surrounding area, a cap 17 made of a material having good thermal conductivity properties is arranged over the insulating layer around the cold conductor 11. Preferably, a thermal insulating part 18 is arranged concentrically in the smaller diameter end of the body 21 to insulate it from the cap 17. When the narrow, screw threaded end of the temperature sensor 10 is screwed into the housing of a hydraulic coupling, the coil 12 is normally in a short-circuited condition. The cold conductor 11 responds to changes in the temperature of the hydraulic fluid or oil in the hydraulic coupling with a particularly short time lag and, as soon as a preset temperature is exceeded, the resistance of the cold conductor 11 is increased so sharply that, in practice, the electrical coil 12 is effectively rendered open at the ends 12a and 12b. Thus, when the temperature sensor 10 is located, for example, in an arrangement shown schematically in FIG. 2, with its coil 12 no longer short-circuited, and the sensor 10 is passed in front of an initiator 14 of a measuring device 13, a conventional oscillator located in the initiator 14 is not damped (which would normally be the case if the coil 12 were short-circuited). This initiates a switching process, for example, which in turn initiates suitable measures which are called for by the increased temperature.

Figure 2:
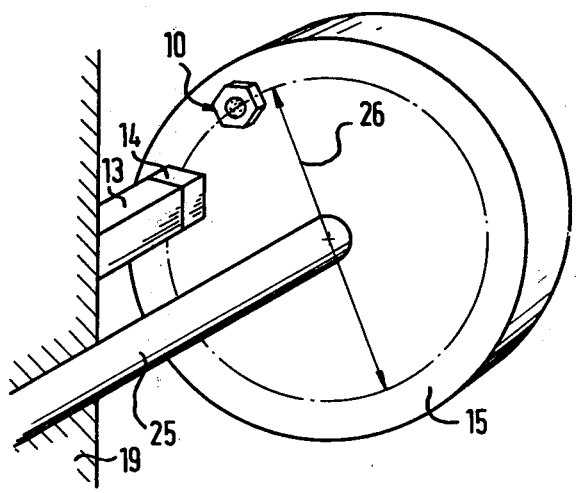
FIG. 2 is a schematic perspective illustration of an arrangement according to the invention in which the temperature sensor of FIG. 1 is arranged on a hydraulic coupling so as to pass by a fixed measuring device in a rotational plane close to but not in contact with the measuring device.

FIG. 2 shows a hydraulic coupling 15 which runs on a shaft 25. On its front end face, the hydraulic coupling 15 carries the temperature sensor 10. The sensor 10 on the coupling 15 is radially offset on the coupling 15 and is arranged so that during rotation of the coupling, the sensor passes in a rotational plane close to the end face of the initiator 14, i.e., it may be spaced away from the initiator, for example, a distance of 10 millimeters. The initiator 14, in turn, is attached to the measuring device 13, which is fixed to a stationary holder 19.

If the sensor 10 is fitted to a metal housing of a hydraulic coupling, the coil 12 must be spaced from the front face of the metal housing so that the coil rotates in a plane closer to the measuring device 13. Only in this way is it possible to ensure that when the measuring device 13 is being passed, the oscillator is damped only during the time when the coil surface passes by adjacent to the oscillator. Depending on the switching distance of the oscillator, the front face of the metal housing must be spaced at a sufficient distance to prevent damping of the oscillator by the metal of the housing.

The coil 12 must be constructed such that it does not present any "continuous metal surface" for the oscillator in the initiator 14. In other words, the distances between the separate windings of the coil must be sufficiently wide to prevent the coil, when it is open, from still damping the oscillator. In practice, it has been found satisfactory in an industrial plant embodiment to have conductor tracks with a width of approximately 0.2 to 0.3 mm and distances between the conductor tracks of approximately 0.4 to 0.6 mm, on a coil with around 30 windings. The above values are only intended to give a visual concept of one possible practical construction form.

Furthermore, the diameter of the coil basically has decisive effect on the impulse duration. Naturally, this also depends on the rotary speed at which the coil 12 passes the initiator 14 when the temperature sensor 10 is fitted to the housing of a hydraulic coupling which is rotating at a specific rotary speed.

Assuming a rotary speed of around 3000 rpm, the temperature sensor 10 revolves with a frequency of 50 Hz, so that with an inner circle diameter 26 of around 100 cm, impulses with a duration of around 120 $\mu$sec are produced. Preferably, these impulses will be spread for a duration of a magnitude of around 5 milliseconds by a suitable impulse forming circuit so that the proper signal impulses can be readily distinguished in the subsequently connected evaluation circuit from interference impulses. In many cases, these occur as very narrow impulses. In this way, it is possible to distinguish clearly between interference impulses with a duration of 1 to 2 milliseconds and the actual signal impulses, without the necessity for screened conductors.

Figure 4:
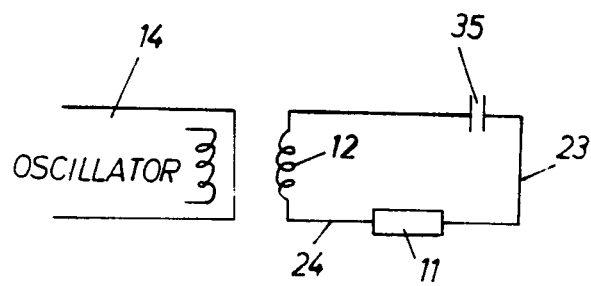
FIG. 4 is a schematic of an alternate circuit for the sensor shown in FIG. 1.

FIG. 4 shows a modified circuit for use in the sensor of FIG. 1. In the illustrated modified arrangement, a capacitor or condenser 35 is placed in lead 23 and is in series with the coil 12 and with the cold conductor 11, thereby forming a series resonant circuit. According to a preferred arrangement of the invention, the resonant frequency of the oscillator in the initiator 14 and the resonant frequency of the series circuit shown in FIG. 4 are tuned to each other, so that the sensitivity of the measuring device can be greatly increased.

The use of a device according to this invention is not restricted to rotating equipment. The temperature sensor 10 could also be arranged on a machine part which is movable to and fro or reciprocatingly. Basically, the invention can be used in all cases where a permanent connection between the temperature sensor 10 and the measuring device associated with it presents problems and thus where relative movements are to be allowed between these two component parts of the measuring device, whereby a contact-free method of working is obtained.

It is expedient to install in the evaluation device a so-called start-up by-pass of a known type, such as is normally used in monitoring devices for rotating parts. This start-up by-pass prevents the monitoring device from being effective from the instant when the apparatus is switched on, and delays its effectiveness until the rotating part has attained the nominal rotary speed. If this were not done, under certain circumstances a rotating machine could not be started up, since even when it is stationary, a fault could be reported. The installation of a start-up by-pass of this kind need not be described in detail here, since it is a normal known measure.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. An arrangement for monitoring the temperature of a moving component for generating a signal, or the like, when a preset temperature is reached, comprising:
    a stationary measuring device which is held stationary relative to the moving component;
    a temperature sensor for being placed on the moving component;
    said sensor comprising an electrical coil for acting upon said measuring device as said sensor moves by said measuring device; said sensor further comprising an electrical device spaced from said coil and electrically connected thereto; said electrical device having the characteristic that it senses temperature and alters its impedance in response to the sensed temperature; said electrical device having the characteristic that said coil is effectively short-circuited when the temperature sensed by said electrical device is on one side of said preset temperature and said coil is effectively open when the sensed temperature is on the other side of said preset temperature;
    said measuring device including an initiator having an oscillator which is operable without contact with said sensor; said measuring device being arranged and placed such that it produces impulses due to damping occurring in said oscillator only when said coil, as it is moved past said measuring device, is in a selected one of its effective conditions of being short-circuited or open circuited, and said measuring device being adapted to generate a signal, or the like, upon the absence of impulses which is indicative of said coil having changed from one of its said effective conditions to the other.

2. The arrangement of claim 1, wherein said sensor comprises a supporting body having opposite ends; said coil being at one said end and said electrical device being at the opposite said end; said body having a bore therethrough; electrical leads joining said electrical device and said coil, and said leads passing through said bore.

3. The arrangement of claim 2, wherein said electrical device of said sensor is a cold conductor having the characteristic that its impedance changes rapidly over a predetermined range of sensed temperature.

4. The arrangement of claim 3, wherein said body has an insulating substance therein in which said coil and said cold conductor are imbedded; at said body opposite end adjacent said cold conductor, said body including a rotationally symmetrical portion which is externally threaded for enabling said body to be screwed into a correspondingly threaded opening in the moving component.

5. The arrangement of claim 4, wherein a portion of said body adjacent to said one end is formed for enabling the action of screwing in of said body threaded portion.

6. The arrangement of claim 4, further comprising a moving component which moves with respect to said measuring device; said moving component having an end face; said sensor being mounted to said moving component end face with said coil being spaced from and moving past said measuring device.

7. The arrangement of claim 6, further comprising a cap comprised of a material of good thermal conductivity; said cap being placed on said body to cover over said cold conductor; said cold conductor being placed to be exposed to the outside of said body and to be covered over by said cap; said cold conductor and said cap being placed in an axial position on said body such that when said body is mounted to said moving component, said cold conductor and said cap are inside said moving component from said end face into which said body is emplaced.

8. The arrangement of claim 7, further comprising a thermally insulating part located between said cap and the said end of said body at which said cap is positioned.

9. The arrangement of claim 2, further comprising a moving component which moves with respect to said measuring device; said moving component having an end face; said sensor being mounted to said moving component end face with said coil being spaced from and moving past said measuring device.

10. The arrangement of claim 9, wherein said moving component is mounted for rotation, with the rotation axis of said moving component passing through said end face thereof; said sensor being at a radially offset position on said end face of said component.

11. The arrangement of claim 10, wherein said sensor is mounted such that said coil face is out of said moving component and toward, but spaced from, said measuring device.

12. The arrangement of claim 1, further comprising a moving component which moves with respect to said measuring device; said moving component having an end face; said sensor being mounted to said moving component end face with said coil being spaced from and moving past said measuring device.

13. The arrangement of claim 12, wherein said moving component is mounted for rotation, with the rotation axis of said moving component passing through said end face thereof; said sensor being at a radially offset position on said end face of said component.

14. The arrangement of any one of claims 1, 2, 9 or 10, wherein said coil is in one plane and is of helical construction.

15. The arrangement of claim 14, wherein said coil is comprised of a circuit board comprised of a synthetic material; a printed conductor track being arranged on said circuit board.

16. The arrangement of claim 14, wherein said initiator has the characteristic that it has a periodic time of a magnitude such that evaluation of a damping time of about 10 microseconds is obtained.

17. The arrangement of claim 14, further comprising a condenser which is series connected in circuit to said coil; said oscillator of said initiator and said circuit formed by said condenser and said coil being tuned to the same resonant frequency.

18. The arrangement of either of claims 1 or 9, wherein said electrical device of said sensor is a cold conductor having the characteristic that its impedance changes rapidly over a predetermined range of sensed temperature.

19. The arrangement of claim 18, wherein said initiator has the characteristic that it has a periodic time of a magnitude such that evaluation of a damping time of about 10 microseconds is obtained.

20. The arrangement of claim 18, further comprising a condenser which is series connected in circuit to said coil; said oscillator of said initiator and said circuit formed by said condenser and said coil being tuned to the same resonant frequency.

21. The arrangement of either of claims 1 or 9, wherein said initiator has the characteristic that it has a periodic time of a magnitude such that evaluation of a damping time of about 10 microseconds is obtained.

22. The arrangement of either of claims 1 or 9, further comprising a condenser which is series connected in circuit to said coil; said oscillator of said initiator and said circuit formed by said condenser and said coil being tuned to the sme resonant frequency.

* * * * *